US009648511B2

(12) United States Patent
Kim et al.

(10) Patent No.: US 9,648,511 B2
(45) Date of Patent: May 9, 2017

(54) METHOD AND DEVICE FOR SUGGESTING RECORDING INFORMATION AND ACQUIRING POSITIONAL INFORMATION TO ALLOW MDT TECHNOLOGY TO BE EFFECTIVELY UTILIZED IN A MOBILE COMMUNICATION SYSTEM

(71) Applicant: Samsung Electronics Co., Ltd., Gyeonggi-do (KR)

(72) Inventors: Sang Bum Kim, Gyeonggi-do (KR); Soeng Hun Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/351,011

(22) PCT Filed: Oct. 10, 2012

(86) PCT No.: PCT/KR2012/008212
§ 371 (c)(1),
(2) Date: Apr. 10, 2014

(87) PCT Pub. No.: WO2013/055102
PCT Pub. Date: Apr. 18, 2013

(65) Prior Publication Data
US 2014/0287694 A1    Sep. 25, 2014

Related U.S. Application Data

(60) Provisional application No. 61/545,363, filed on Oct. 10, 2011, provisional application No. 61/552,114, (Continued)

(51) Int. Cl.
*H04W 24/00* (2009.01)
*H04W 24/10* (2009.01)
*H04W 64/00* (2009.01)

(52) U.S. Cl.
CPC ........... *H04W 24/10* (2013.01); *H04W 64/00* (2013.01)

(58) Field of Classification Search
CPC ..................................................... H04W 24/10
(Continued)

(56) References Cited

U.S. PATENT DOCUMENTS 6,330,450 B1 *  12/2001  Wallstedt ............. H04B 17/318
                                                        455/115.3
8,077,674 B2 *  12/2011  Kiribayashi ........... H04W 28/18
                                                        455/437

(Continued)

FOREIGN PATENT DOCUMENTS

KR  1020090104482    10/2009
KR  1020100105488     9/2010
(Continued)

OTHER PUBLICATIONS

PCT/ISA/237 Written Opinion issued on PCT/KR2012/008212 (pp. 4).

(Continued)

*Primary Examiner* — Wen Huang
(74) *Attorney, Agent, or Firm* — The Farrell Law Firm, P.C.

(57) ABSTRACT

A method of measuring channel information using a terminal in a communication system, according to an embodiment of the present invention, includes the steps of: receiving channel measurement setup information from a base station; entering an idle mode in the state of communication with the base station; measuring information indicating according to the channel measurement setup information; and transmitting a signal including the measured information to the base station. In addition, a terminal for measuring channel information according to another embodiment of the present (Continued)

invention includes: a transmitting/receiving unit for receiving channel measurement setup information from a base station; and a control unit for controlling the terminal so that the terminal enters an idle mode in the state of communication with the base station and measures information indicating according to the channel measurement setup information, wherein the transmitting receiving unit transmits a signal including the measured information to the base station. According to an embodiment of the present invention, it is easier to identify a channel state by using an MDT measurement result by further reporting various pieces of information when measuring MDT. In addition, it is possible to perform a report on MDT measurement by using a terminal and thus the need for a drive test may be reduced.

12 Claims, 10 Drawing Sheets

Related U.S. Application Data filed on Oct. 27, 2011, provisional application No. 61/559,674, filed on Nov. 14, 2011.

(58) Field of Classification Search
USPC .............................................. 455/424, 67.11
See application file for complete search history.

(56) References Cited

U.S. PATENT DOCUMENTS

| | | | |
|---|---|---|---|
| 2009/0005119 A1* | 1/2009 | Patel et al. ................. | 455/562.1 |
| 2010/0190488 A1* | 7/2010 | Jung et al. ................... | 455/424 |
| 2011/0081868 A1* | 4/2011 | Kim et al. ................. | 455/67.11 |
| 2011/0105123 A1 | 5/2011 | Lee et al. | |
| 2011/0319070 A1* | 12/2011 | Nosley et al. ............. | 455/422.1 |
| 2012/0020231 A1* | 1/2012 | Chen ..................... | H04W 36/08 |
| | | | 370/252 |
| 2012/0108199 A1* | 5/2012 | Wang et al. .................. | 455/405 |
| 2012/0214541 A1* | 8/2012 | Narasimha ............. | H04L 5/001 |
| | | | 455/525 |
| 2012/0225669 A1* | 9/2012 | Brandt et al. .............. | 455/456.1 |
| 2013/0045735 A1 | 2/2013 | Kim et al. | |

FOREIGN PATENT DOCUMENTS

| | | |
|---|---|---|
| KR | 1020110081441 | 7/2011 |
| KR | 1020110088446 | 8/2011 |
| KR | 1020110093642 | 8/2011 |
| KR | 1020110095088 | 8/2011 |
| KR | 1020110122617 | 11/2011 |

OTHER PUBLICATIONS

PCT/ISA/210 Search Report issued on PCT/KR2012/008212 (pp. 5).
3GPP TS 37.320 version 10.1.0 Release 10, ETSI TS 137 320 V10.1.0 (Apr. 2011) (pp. 18).
3rd Generation Partnership Project; Technical Specification Group Radio Access Network; Universal Terrestrial Radio Access (UTRA) and Evolved Universal Terrestrial Radio Access (E-UTRA); Radio Measurement Collection for Minimization of Drive Tests (MDT); Overall Description; Stage 2 (Release 10) 3GPP TS 37.320 V10.20, Jun. 1, 2011, 17 pages.
European Search Report dated Jan. 15, 2016 issued in counterpart application No. 12839409.5-1854, 8 pages.

* cited by examiner

METHOD AND DEVICE FOR SUGGESTING RECORDING INFORMATION AND ACQUIRING POSITIONAL INFORMATION TO ALLOW MDT TECHNOLOGY TO BE EFFECTIVELY UTILIZED IN A MOBILE COMMUNICATION SYSTEM

TECHNICAL FIELD

The present invention relates to a method and apparatus for providing logged information for effective use of MDT technology and acquiring location information in a mobile communication system.

BACKGROUND ART

The mobile communication system developed for the user to communicate on the move. With the rapid advance of technologies, the mobile communication system has evolved to the level capable of providing high speed data communication service beyond the early voice-oriented services. Recently, as one of the next generation mobile communication system, Long Term Evolution-Advanced (LTE-A) is on the standardization by the $3^{rd}$ Generation Partnership Project (3GPP). LTE is a technology for realizing high-speed packet-based communications with the data rate higher than the currently available data rate aims at commercial deployment around 2010 timeframe.

With the evolution of the 3GPP standard, many studies being conducted for optimization of radio networks as well as improvement of data rate. In the initial radio network configuration or optimization stage, a base station or a base station controller should collect radio environment information related to its own cell coverage, and this process is called Drive Test. The conventional drive test is very time-consuming and laborious task performed in such a way that an operator carries the test apparatuses on a vehicle while performing the measurement task repeatedly for a long time. The measurement result is used to configure the system parameters of the base stations or base station controllers. Such a conventional drive test increases total costs and time of the radio network optimization and maintenance. Study on minimization of drive tests and enhancement of radio environment analysis process and manual configuration is being conducted in the name of MDT (Minimization of Drive Test). In more detail, the terminal measures the cell information and supplementary information on the neighbor eNBs. The terminal reports the radio channel measurement information to the eNB periodically or immediately in response to a specific event or after a predetermined time has elapsed from the time point when the radio channel measurement information has been logged. At this time, the UE operation of transmitting the measured cell information and other supplementary information to the UE is referred to as MDT measurement information report. If it is in the state capable of communicating with the eNB, the terminal transmits the neighbor cell information measurement result to the eNB immediately. Otherwise, if it is not in the state capable of communicating with the eNB, the terminal retains the logged measurement information and, when it becomes possible to communicate with the eNB, transmits the retained MDT measurement report. In the following description, the radio channel information measured by the terminal and other supplementary information are referred to as MDT measurement information, and the operation transmitting the MDT measurement information from the terminal to a base station is referred to as MDT measurement information report. When reporting MDT measurement information, if it is possible to communicate with the base station, the terminal transmits the MDT measurement information immediately. Otherwise, it is impossible to communicate with the base station currently, the terminal waits until it becomes possible to communicate with the base station. The base station uses the MDT measurement information reported by the terminal for cell area optimization.

FIG. 1 is a diagram illustrating a drive text without MDT scheme and MDT execution procedure. The conventional drive test is performed in a way of measuring signal state while roaming around the service area to search for coverage holes on a vehicle carrying the measurement device. In MDT, the terminal performs this operation instead. A Network Monitoring System (NMS) 105 may instruct to perform MDT. At this time, the NSM 105 provides an Element Manager (EM) 110 with configuration information necessary for MDT. The EM 110 generates MDT configuration to an evolved Node B (eNB) 115. The eNB 115 sends a User Equipment (UE) 120 the MDT configuration information to instruct to perform MDT as denoted by reference number 125. The UE 120 performs MDT to collect MDT measurement information. The MDT information may include location and time information as well as the signal measurement information. The collected MDT measurement information is reported to the eNB 115 as denoted by reference number 130, and the eNB 115 sends the MDT measurement information to a Trace Collection Entity (TCE) 135. The TCE 135 is a server for collecting MDT measurement information.

DISCLOSURE OF INVENTION

Technical Problem

The present invention aims to provide a method and apparatus for the UE to take into consideration of more various environments in MDT measurement and report the measurement to the eNB.

Solution to Problem

In accordance with an aspect of the present invention, a channel information measurement method of a terminal in an communication system includes receiving a channel measurement configuration information from a base station, transitioning communication state with the base station to idle mode, measuring information indicated in the channel measurement configuration information, and transmitting a signal including measured information to the base station.

In accordance with another aspect of the present invention, a terminal of measuring channel information includes a transceiver which receives channel measurement configuration information from a base station and a controller which controls the terminal to transition state of communication with the base station to an idle mode and measure information as indicated in the channel measurement configuration information, wherein the transceiver transmits a signal including the measured information to the base station.

Advantageous Effects of Invention

With the report of more various additional informations in MDT measurement, it is possible to facilitate checking channel status based on MDT measurement result.

MODE FOR THE INVENTION

Figure 1:
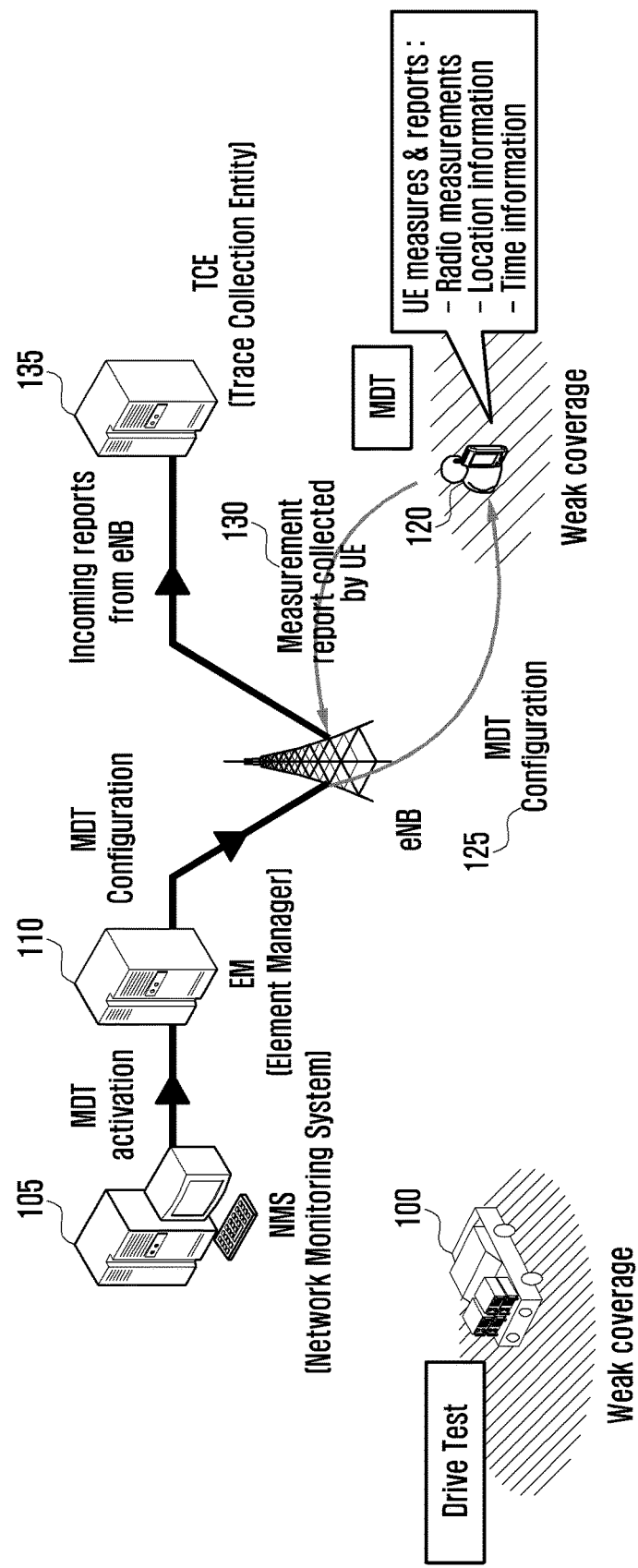
FIG. 1 is a diagram illustrating a drive text without MDT scheme and MDT execution procedure.

Exemplary embodiments of the present invention are described with reference to the accompanying drawings in detail.

Detailed description of well-known functions and structures incorporated herein may be omitted to avoid obscuring the subject matter of the present invention. This aims to omit unnecessary description so as to make the subject matter of the present invention clear.

For the same reason, some of elements are exaggerated, omitted or simplified in the drawings and the elements may have sizes and/or shapes different from those shown in drawings, in practice. The same reference numbers are used throughout the drawings to refer to the same or like parts.

The present invention relates to a method and apparatus for providing logged information for more efficient use of the MDT technology and acquiring location information in a mobile communication system.

Prior to the explanation of the present invention, a description is made of the MDT procedure of the UE in the idle mode.

Figure 2:
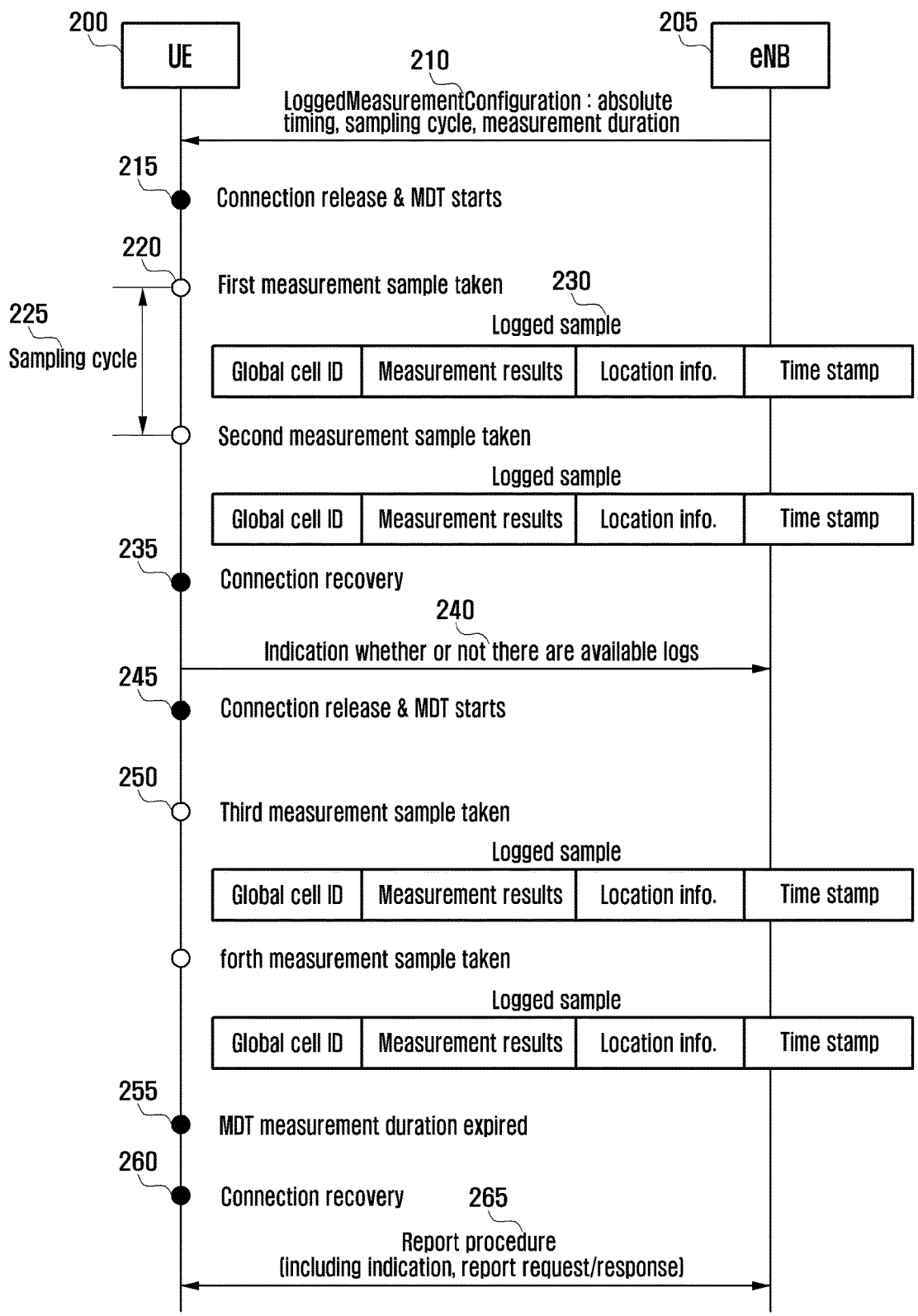
FIG. 2 is a signal flow diagram illustrating the MDT measurement procedure of reporting after logging in the idle mode.

FIG. 2 is a signal flow diagram illustrating the MDT measurement procedure of reporting after logging in the idle mode.

Referring to FIG. 2, the eNB 205 sends the UE 200 in connected mode the information necessary for MDT configuration, i.e. channel measurement configuration information at step 210. The corresponding information includes absolute timer reference information, sampling cycle, measurement duration, and MDT PLMN list. The sampling cycle is sued for periodic downlink pilot signal measurement, and the MDT measurement information is collected and logged at the cycle. The measurement duration is the total time for performing MDT. The MDT PLMN list is the list of the PLMNs to which the UE may report MDT measurement information. If the corresponding time expires, the UE stop performing MDT. If the RRC mode of the UE transitions from the connected mode to the idle mode, the UE starts MDT at step 215. After the first MDT measurement and logging at step 220, the MDT measurement and logging are performed at the predetermined sampling cycle 225. The MDT measurement informations are logged at every measurement sample at step 230. The logged MDT measurement information includes serving cell ID, serving cell channel measurement information (i.e. RSRP/RSRQ value), neighbor cell channel measurement information, UE location information, and relative time information. If the UE enters the connected mode at step 235, the UE notifies the eNB of the presence/absence of logged MDT measurement information. The eNB may request for the logged MDT measurement information at step 240. If requested, the UE reports the MDT measurement information logged until then and deletes the reported information. If there is no request, the UE retains the logged information constantly.

The UE enters the idle mode again at step 245 and, if the measurement duration has not expired, continue MDT to collect MDT measurement information at step 250. The measurement duration may be determined in consideration of the time in the connected mode or not.

If the measurement duration expires at step 255, the UE stops MDT. If the UE enters the connected mode at step 260, the UE notifies the eNB of the presence of the logged MDT measurement information and, if the eNB requests, reports the logged MDT measurement information at step 265.

Figure 3:
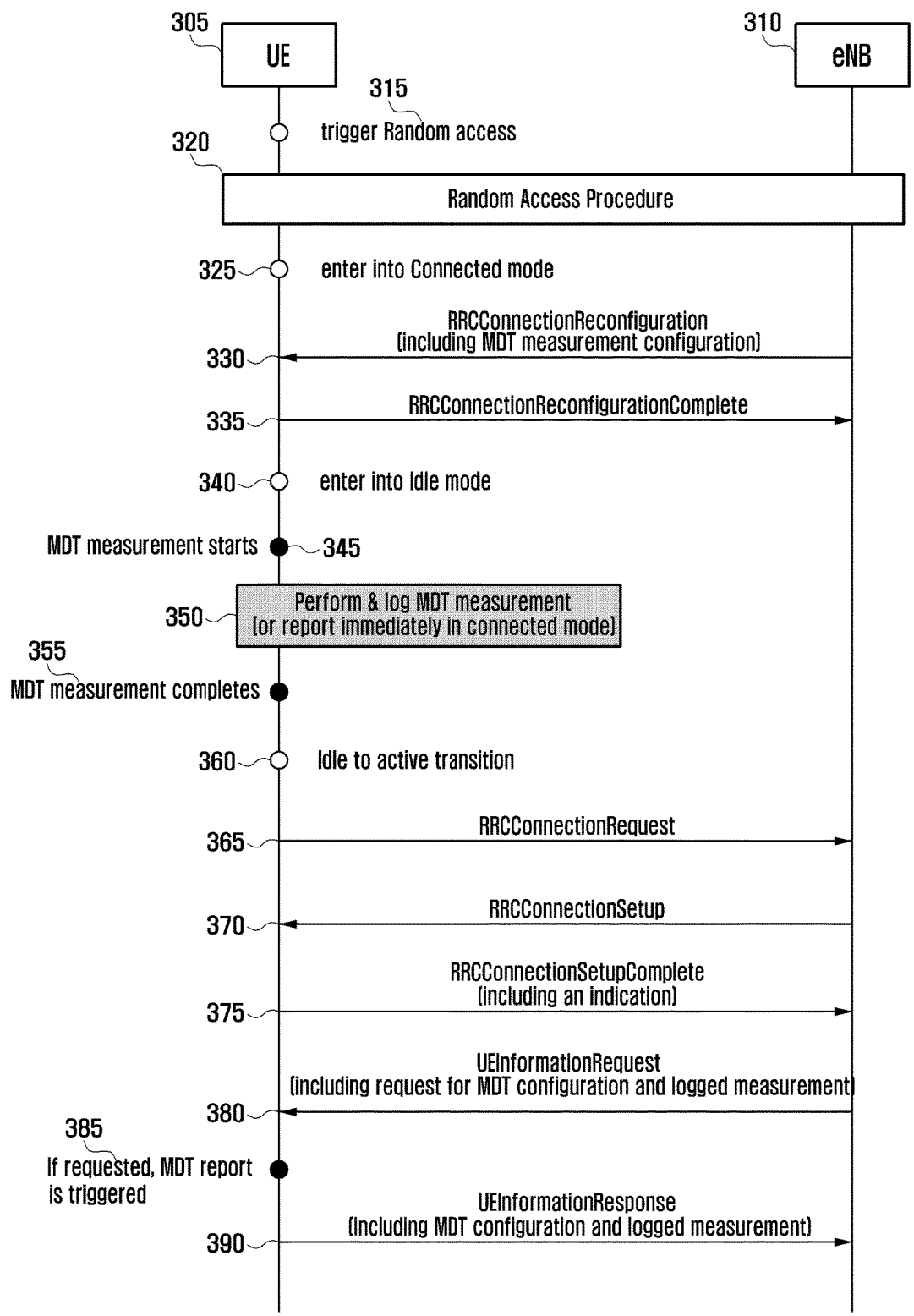
FIG. 3 is a signal flow diagram illustrating the procedure of reporting logged channel measurement information in response to the request of the eNB.

FIG. 3 is a signal flow diagram illustrating the procedure of reporting logged channel measurement information in response to the request of the eNB 310.

Referring to FIG. 3, the UE 305 triggers access for communication with the eNB 310 at step 315 and perform random access at step 320. Afterward, the UE 305 enters the connected mode at step 325. Then eNB 310 sends the UE 304 the LoggedMeasurementConfiguration message including the information necessary for performing MDT in the idle mode, i.e. channel measurement configuration information, at step 330.

Afterward, the UE 305 transitions to the idle mode at step 340 and, if the MDT measurement duration starts, performs MDT measurement at step 345. If the measurement duration expires, the UE 305 stops MDT measurement at step 355. Afterward, the UE 305 determines transition to the connected mode at step 360 and sends the eNB the RRCConnectionRequest message at step 356. If the eNB accepts this, it sends the UE 305 the RRCConnectionSetup message at step 370. The UE 305 entered the connected mode notifies the eNB the presence of the channel measurement information logged in the idle mode at step 375. For this purpose, an indicator is included in the RRCConnectionSetupComplete message. The UE transmits the indicator when the current PLMN is in the MDT PLMN list but to not all PLMNs. In the case of handover, the identifier may be included in the RRCConnectionReconfigurationComplete message. The reason for transmitting the corresponding indicator is to notify the eNB 310 of the presence of the logged MDT measurement information such that the eNB determines whether to request for the MDT measurement information. Typically, the UE 305 may log a large amount of channel measurement information because it stays in the idle mode for a long time. If the UE 305 transitions to the connected mode, it has to consume large amount of resources for transmitting the logged information. Accordingly, the eNB 310 has to determine whether to request for the MDT measurement information in consideration of the current radio capacity status. If it is determined that the channel measurement information logged by the UE 305 is useful, the eNB 310 requests the UE 305 for the MDT measurement information using the UEInformationRequest message at step 380. Upon receipt of the UEInformationRequest message from the eNB 310, the UE triggers transmission of the logged MDT measurement information at step 385. Typically, the logged MDT measurement information has low necessity of urgent transmission, it is preferred to transmit the MDT measurement information in consideration of the priorities of other RRC messages and data. The UE 305 sends the eNB 310 the UEInformationResponse including the MDT measurement information at step 390. The UE 305 may discard the MDT measurement information which has been reported to the eNB 310 already. At step 390, the logged MDT configuration may be transmitted along with the logged measurement result. The UE may delete the MDT measurement information transmitted to the eNB.

<First Embodiment>

The present invention proposes supplementary informations useful for cell area optimization in addition to the conventional MDT measurement information.

Figure 4:
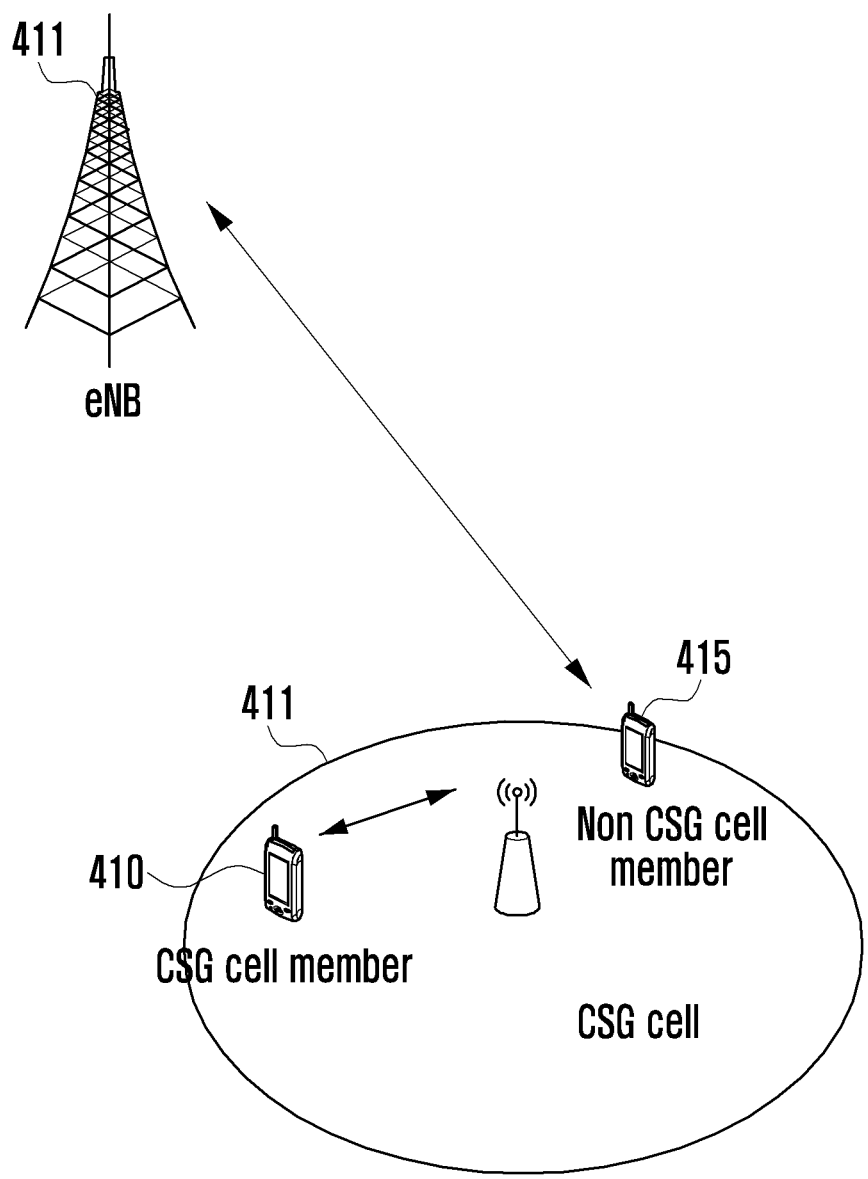
FIG. 4 is a conceptual view of the CSG cell.

The first supplementary information is the channel measurement information for CSG cell other than the current serving cell of the UE. The CSG cell is a small cell allowing only the preregistered members to access. FIG. 4 is a conceptual view of the CSG cell. There are two UEs in the service area 405 of the CSG cell. One UE 410 is a member of the CSG cell so as to connect to the CSG cell for communication, and the other UE 415 is non-member of the CSG cell and thus, although it is in the service area of the CSG cell, cannot connect to the CSG cell but connects to the macro cell eNB 400 far in distance. The UE has the whitelist listing the members of a specific CSG cell.

If there is a CSG cell around the UE which is a member of the CSG cell, the UE regards the CSG cell as its serving cell. If the UE is performing MDT operation, the measurement information of the CSG cell as the serving cell is logged. Meanwhile, there are the CSG cells which are not included in the whitelist of the UE around. Such cells cannot be the serving cell of the UE. However, if the UE logs and reports the channel measurement information of the CSG cells, it can be used for cell area optimization usefully. The eNB sends the UE in the connected mode the LoggedMeasurementConfiguration message indicating whether to log the measurement information on the CSG cell. If the connected mode is released and a predetermined condition is fulfilled, the UE logs the measurement information on the neighbor CSG cells periodically or in response to event. As the predetermined condition, if there is a CSG cell having the best channel condition and which the UE can camp on, the UE can log the channel measurement information on the CSG cell.

Figure 5:
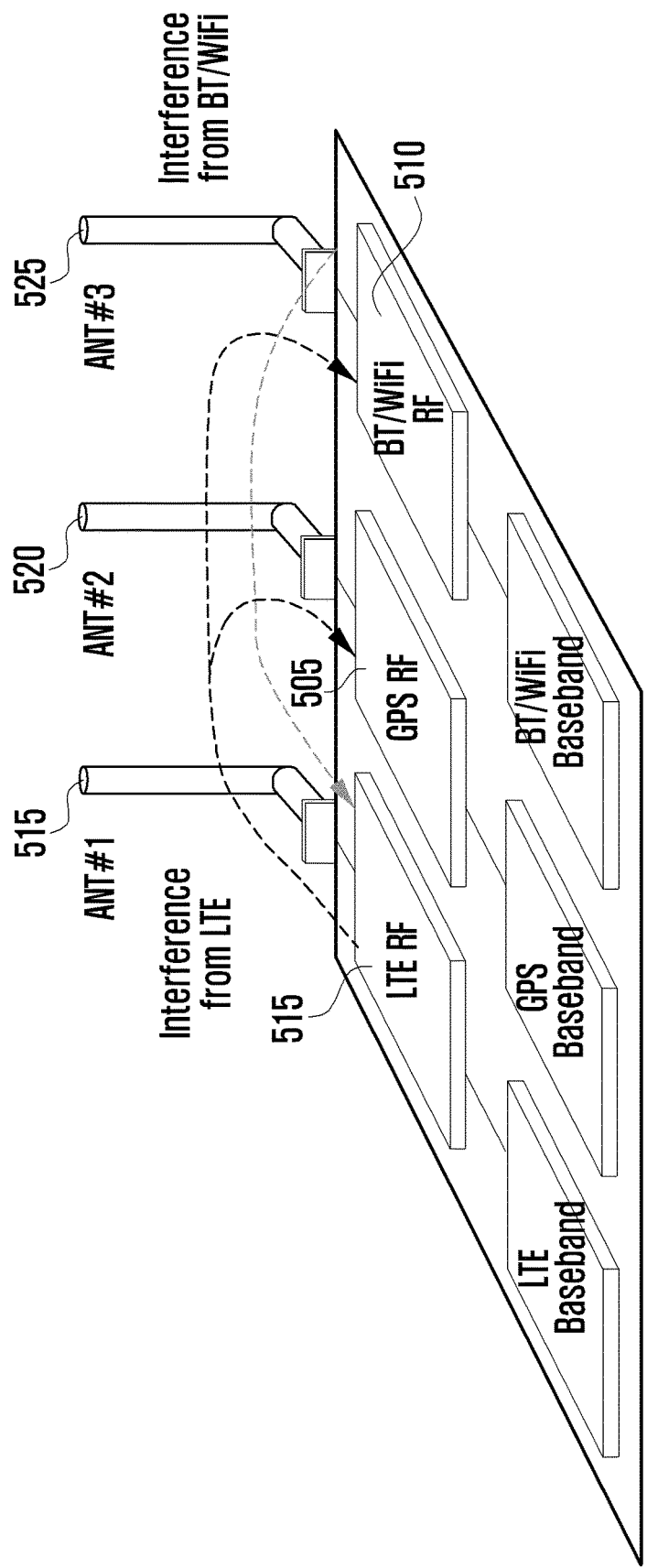
FIG. 5 is a diagram the inside of the UE for explaining in-device interference among multiple communication modules.

The second supplementary information is the information indicating whether the information measured in the idle mode is influenced by in-device component. FIG. 5 is a diagram the inside of the UE for explaining in-device interference among multiple communication modules. Recent UEs have various functions and are equipped with various communication modules for supporting the functions. In addition to the LTE communication module 500, there may be the GPS module 505 and short range communication module 510 such as Bluetooth and WLAN modules. Although the communication systems use different frequency bands, if the frequency bands are adjacent to each other, the communication modules may interfere to among other. This is because the signals transmitted/received on the bands cannot be split ideally. Furthermore, the antennas connected to the respective communication modules are included in same housing, they arranged very closely. Therefore, the interference strengths influencing to each other may be relatively storing. In order to mitigate such interference, there is a need of controlling the transmit powers of the communication modules. For example, when the short range communication module 510 such as Bluetooth and WLAN module is receiving data, the transmission signal of the LTE communication module 500 may cause interference to the short range communication module. Accordingly, indicating whether the MDT result measured in the idle mode is influenced by the in-device interference is useful for the cell area optimization. This is because the influence of the in-device components as the internal problem has to be ruled out in the cell area optimization procedure. The MDT measurement information may indicate when the measurement result is influenced by the in-device interference or include only the measurement result acquired by excluding the in-device interference through L3 filtering process. The L3 filtering is filtering the measurement result value using the following equation.

$$F_n = (1-a) \cdot F_{n-1} + a \cdot M_n \quad (1)$$

Here, $F_{n-1}$ denotes the previous filtering value, and $M_n$ denotes a newly measured value. Tat this time, the new filtering value $M_n$ is derived by applying the coefficient a. This filtering method is used in general for deriving the measurement information value in LTE technology. In the present invention, when it is necessary to express the measurement result at a certain timing as a weighted average of $M_n$, $M_{n+1}$, and $M_{n+2}$, if $M_{n+1}$ is determined as influenced by in-device interference, the UE logs the measurement result acquired by applying the weighted average of $M_n$ and $M_{n+2}$ at the above timing.

The third supplementary information is the information indicating whether the serving frequency and the serving RAT is the highest priority frequency and RAT at the logging time. In LTE, the network may provide the UE of the information on the frequency and RAT having the access priority. This information indicates whether the UEs are connected to the serving frequencies and serving RATs according to the priorities as intended by the network and can be used for cell area optimization.

Figure 6:
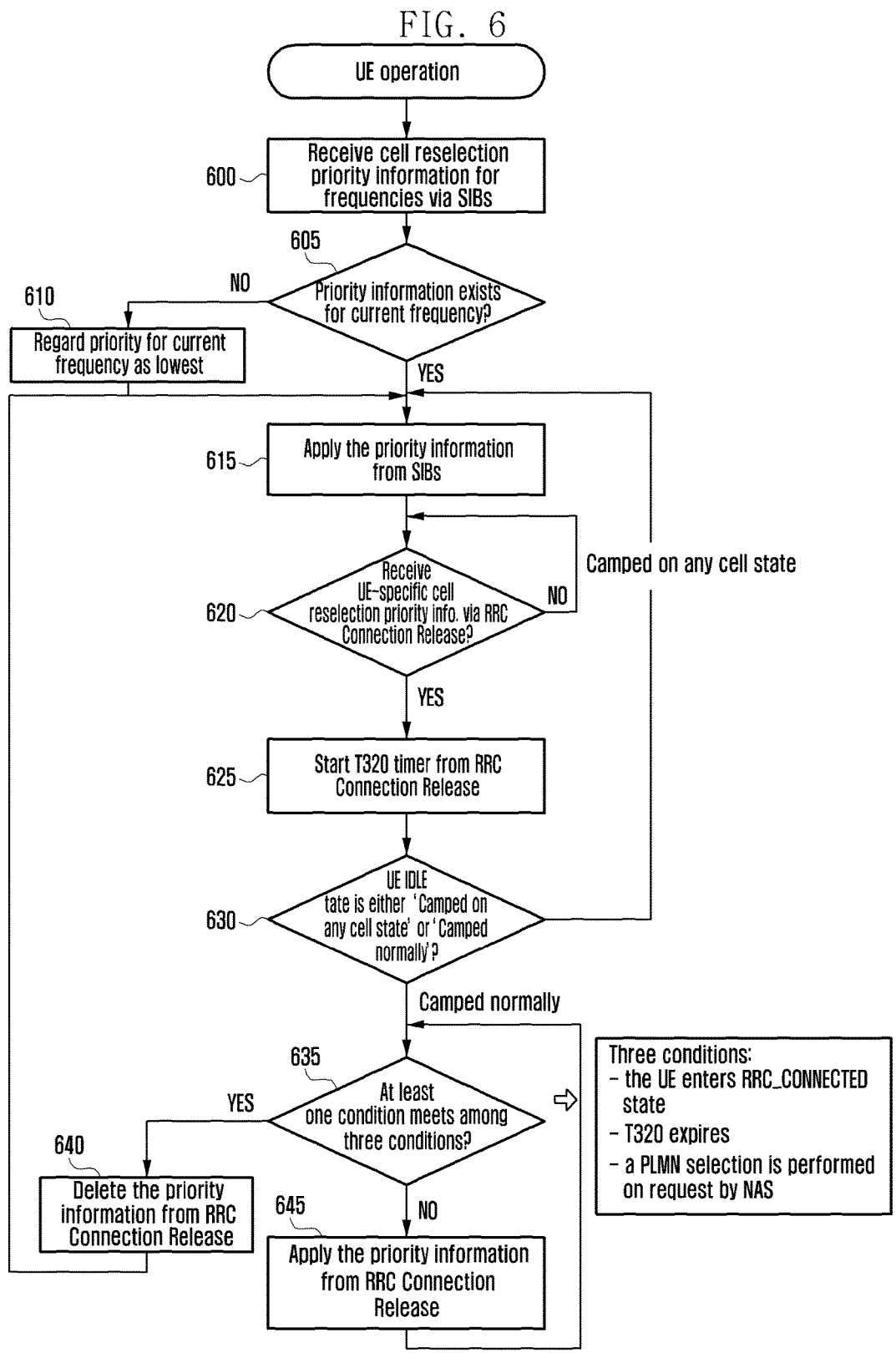
FIG. 6 is a flowchart illustrating a procedure providing a specific UE of the priority information per frequency for cell reselection broadcasted in SIB or RRC Connection Release message as dedicated RRC signaling.

FIG. 6 is a flowchart illustrating a procedure providing a specific UE of the priority information per frequency for cell reselection broadcasted in SIB or RRC Connection Release message as dedicated RRC signaling.

Referring to FIG. 6, cell reselection is a procedure of reselecting the serving cell in order for a roaming UE to connect a cell with best channel condition. The network allocates priority per frequency to control the cell reselection of the UEs in the idle mode. For example, if a UE receives the priority information on the two frequencies f1 and f2 and if f1 has the priority higher than that of f2, the UE is likely to stay on f1. Also, although staying on f2 if the channel condition of f2 is bad, the UE attempts to switch to f1. The priority information on the frequency is broadcast through SIB or transmitted to the UE through RRC connection Release message as a dedicated RRC signaling. Although the UE has the priority information on the frequencies acquired through SIB already, if the UE-specific priority information is received through RRC signaling, the priority acquired from SIB is ignored. The priority information per frequency is transmitted in cellReselectionPriority IE and one of the 8 stepwise priorities. The frequencies of RATs cannot be assigned the same priority. If the idle state of the UE is set to 'camped on any cell state,' the frequency priority received through SIB is applied but the priority information received through RRC signaling is just stored but not used. The cellReselectionPriority IE is an optional IE and thus may not exist. In this case, the priority information on the corresponding frequency is not assigned. At this time, the UE regards that the priority of the corresponding frequency is very low. The UE receives the priority information on the frequencies used in other RATs as well as E-UTRA through SIB at step 600. However, the priority information is not provided for all frequencies. The priority information on the frequency of the serving cell which the UE has camped on currently also may not be provided. The UE check this at step 605. If the priority information on the frequency of the current serving cell is not provided, the UE regards the priority of the frequency as the lowest priority. The UE applies the priority informations of the respective frequencies at step 615. If the RRC Connection Release message is received from the eNB, the UE transitions from the connected mode to the idle mode. The RRC message may include the priority information on the frequency. It is UE-specific information and thus applied with priority as compared to the frequency priority information received through SIB. Accordingly, the UE checks whether the RRC message includes the frequency priority information at step 620. If the frequency priority information is included, the UE applies the T320 value included together to start a timer at step 625. The UE determines whether the current idle mode state is 'camped on any cell state' or 'camped normally state' at step 630. The 'camped normally state' denotes the state where the UE has camped on the suitable cell. The suitable cell is the cell capable of providing the UE with normal services and fulfilling the following detailed conditions.

cell belonging to the selected PLMN, registered PLMN, or equivalent PLMN list.
cell not barred
cell fulfilling cell selection criterion
If CSG cell, the cell having CSG ID in whitelist of the UE The 'camped on any cell state' denotes the state in which the UE fails camping on the suitable cell and thus camps on the acceptable cell. In the acceptable cell, the UE cannot receive any normal service but only can place an emergency call. The acceptable cell is the cell fulfilling the following conditions.

cell not barred
cell fulfilling cell selection criterion

If the UE is in the 'camped on any cell state' the procedure goes to step 615 to apply the frequency priority information provided in SIB instead of the priority information provided in the RRC Connection Release message. If the UE is in the 'camped normally state', the UE determines whether at least one of the following conditions is fulfilled at step 635.

UE transition to connected mode
T320 timer expire
PLMN selection procedure is performed according to NAS request If at least one of the above conditions is fulfilled, the UE discards the priority information provided in the RRC Connection Release message at step 640, and the procedure goes to step 615 to apply the frequency priority information provided in SIB. Otherwise if none of the conditions is fulfilled, the UE applies the priority information provided in the RRC Connection Release message at step 645.

The frequency priority information affects the frequency measurement of the UE. For the frequency having the priority higher than that of the current serving cell, the UE performs measurement always. In contrast, for the intra-frequency or the frequency with the priority equal to or lower than that the current serving cell, the UE does not perform measurement to save UE power. The measurement is performed when the channel QoS of the serving cell is equal to or less than a predetermined threshold value. The cell reselection is performed to move to the cell having good channel condition and thus there is no reason for moving to the frequency having the priority equal to or lower than that of the current frequency even though the channel QoS of the current serving cell is good. In order to reduce the power consumption caused by unnecessary channel measurement, whether to perform the measurement is determined based on the predetermined threshold value. In the case of the intra-frequency, if the QoS of the serving cell is equal to or less than a predetermined threshold value $S_{intrasearch}$, the channel measurement is performed for the other cell operating on the same frequency. In the case of the frequency having the equal or lower priority, if the QoS of the serving cell is equal to or less than the threshold value $S_{nonintrasearch}$, the channel measurement is performed for the cells operating on the different frequencies. Typically, the channel QoS considers RSRP and RSRQ.

In the state of performing measurement, if the channel QoS of the cell operating on the frequency having the higher priority becomes lower than a predetermined threshold $Thresh_{X-high}$, the UE reselects the cell operating the frequency having the high priority as the serving cell. If the channel QoS of the cell operating on the frequency having the low priority is higher than a predetermined threshold value $Thresh_{X-low}$ and if the QoS of the serving cell is lower than $Thresh_{Serving-low}$, the UE reselects the cell operating on the frequency having the low priority as the serving cell.

Figure 7:
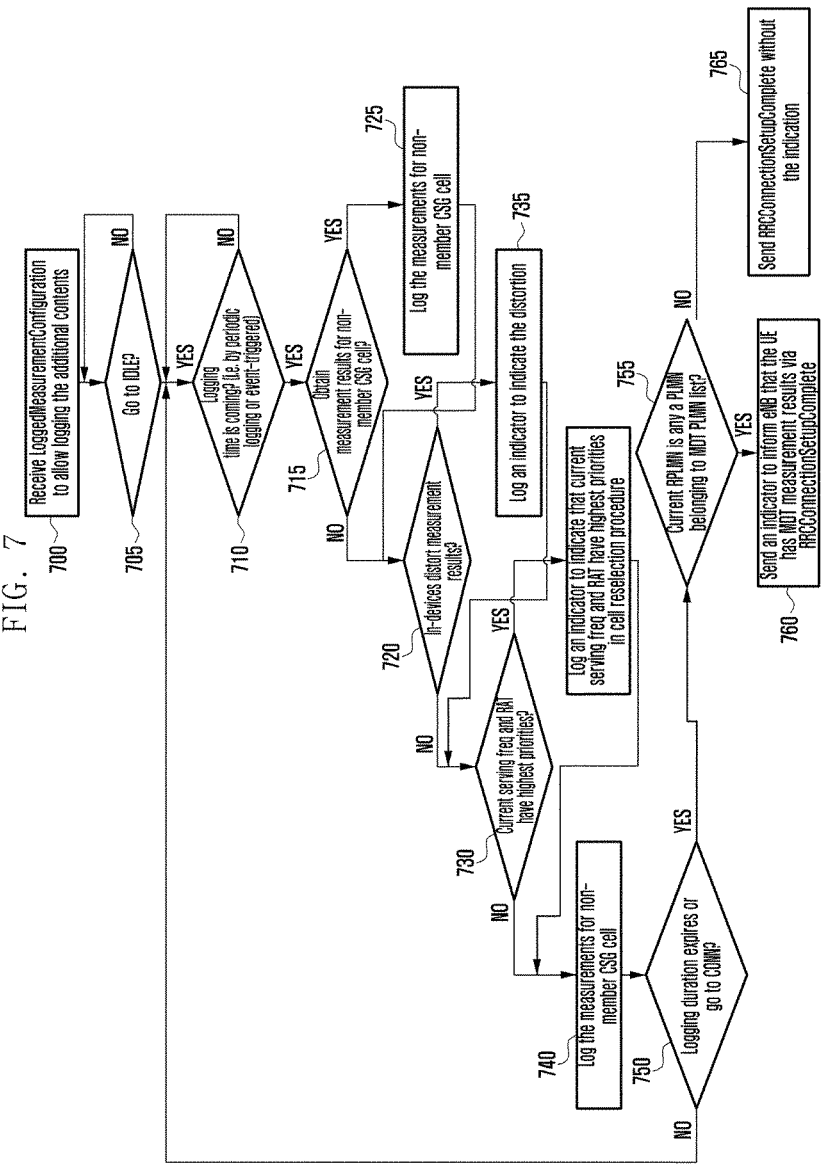
FIG. 7 is a flowchart illustrating a UE procedure according to the first embodiment of the present invention.

FIG. 7 is a flowchart illustrating a UE procedure according to the first embodiment of the present invention. The UE receives the LoggedMeasurementConfiguration message indicating whether to log the measurement informations proposed in the present invention from the eNB at step 700. The eNB configures the RRC message to instruct the UE to log the proposed measurement informations. The UE transitions to the idle mode at step 705. The UE performs MDT operation and determines whether a periodic or even-triggered logging time arrives at step 710. If the logging time arrives, the UE determines whether any channel measurement information on the non-member CSG cell around the UE is present at step 715. Here, the non-member CSG cell is the cell which is not included in the whitelist of the UE and thus the UE is barred to camp thereon. The channel measurement information on the CSG cell may include ECGI value, PCI value, Tracking Area Code (TAC) value, plmn-IdentityList value broadcast in SIB1 of the CSG cell, and RSRP/RSRQ value. If the information is present, the UE logs the measurement informations of the CSG cell at step 725. The UE determines whether the measurement informations on the serving and neighbor cells are influenced by the in-device components at step 720. If influenced, the UE logs an indicator indicating this at step 735. As an alternative, it is possible to log the measurement information excluding the influence by the in-device components. The UE determines whether the current serving cell or the serving cell RAT has the highest priority in the cell reselection procedure at step 730. If so, the UE logs an indicator indicating this at step 745. The UE logs the legacy MDT measurement informations at step 740. The UE determines whether the MDT duration has expired or the transmission to the connected mode has occurred at step 750. If the MDT duration has not expired or the transition to the connected mode has not occurred, the UE continue MDT operation. Otherwise, the UE transitions to the connected mode and determines whether the current serving PLMN is the PLMN included in the MDT PLMN list at step 755. If included, the UE includes an indicator indicating that the logged MDT measurement information is present in the RRCConnectionSetupComplete message. Otherwise, the UE transmits the RRCConnectionSetupComplete message without the indicator.

<Second Embodiment>

If the UE location information is included in the RLF report, this is likely to be useful for cell area optimization. However, the RLF occurs without notification, and the configuration information for RLF report is not provided by the eNB. Accordingly, in order to include the UE location information in the RLF report, there may be need of pre-defined configuration. The UE location information may be acquired using the GNSS receiver. The GNSS receiver is capable of providing relatively accurate location information to the outdoor UE. If the UE location information acquired by means of the GNSS receiver is included in the RLF report, the network may check the RLF occurrence time accurately. For this purpose, this embodiment proposes a method for the UE to activate the GNSS receiver to acquire UE location information when the RLF occurs.

Figure 8:
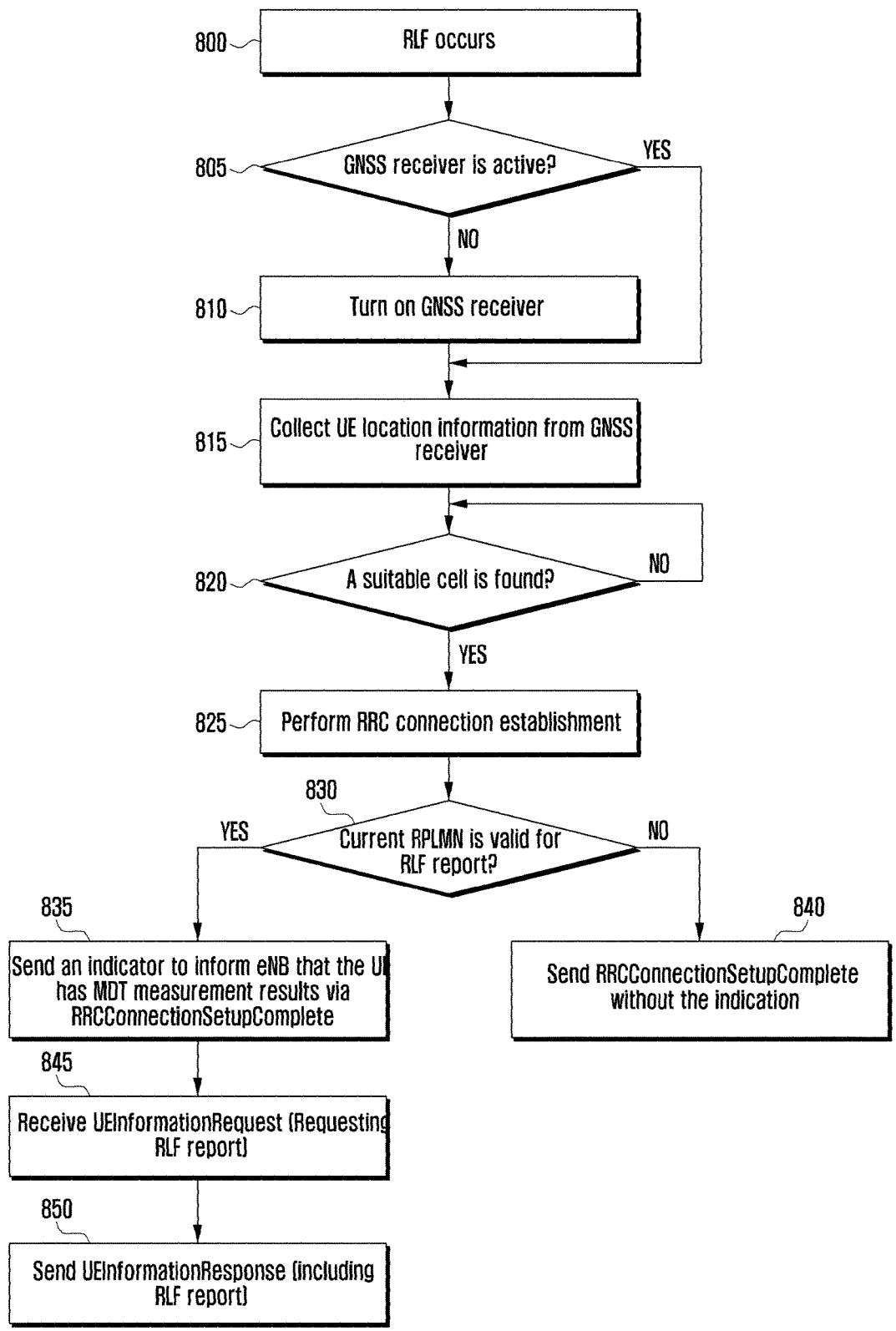
FIG. 8 is a flowchart illustrating a procedure for the UE to acquire UE location information using a GNSS receiver and include the information in the RLF report.

FIG. 8 is a flowchart illustrating a procedure for the UE to acquire UE location information using a GNSS receiver and include the information in the RLF report. At step 800, RLF occurs to a specific UE. The UE determines whether the GNSS receiver is active at step 805. If active, the UE collects the UE location information using the GNSS receiver and logs the collection information at step 815. If the GNSS receiver is not active, the UE turns on the GNSS receiver at step 810 and then performs the operation of step 815. At step 820, the UE searches for a suitable cell after the occurrence of RLF. If a suitable cell is found, the UE perform RRC connection establishment procedure at step 825. The UE determines whether the current PLMN is a suitable PLMN for RLF report based on a predetermined condition at step 830. For example, if the current PLMN is identical with the Primary PLMN when RLF has occurred, the UE may transmit the RLF report to the current PLMN. If the current registered PLMN (RPLMN) is identical with the RPLMN or ePLMN when the RFL has occurred, the UE may transmit the RLF report. If it is possible to send the RLF report in the current PLMN according to a predetermined condition, the UE includes transmitting the RRCConnectionSetupComplete message indicating the presence of the logged RLF report at step 835. The UE receives the UEInformationRequest message requesting for RLF report from the eNB at step 845. The UE sends the eNB the RLF report using the UEInformationResponse message.

<Third Embodiment>

The UE may perform MDT in the connected mode as well as the idle mode. In the connected mode, the legacy measurement mechanism is reused, but the UE location information which is not provided in the legacy mechanism is reported additionally. The UE in the connected mode may acquire the UE location information through various location information measurement methods. Examples of the method include Observed Time Difference Of Arrival (OTDOA) and Global Navigation Satellite System (GNSS) positioning. The OTDOA is a method of calculating the UE location information using the informations received from several eNBs. The GNSS positioning is the method of acquiring the UE location information using the integrated GNSS receiver. If the UE is capable of collection the location information through multiple means, there is a need of a method for supporting this. The UE has to notify the eNB of the location information measurement methods, and the eNB selects the best location information measurement method based on the notification and instructs the UE to acquire the location information using the recommended method. For example, since the GNSS receiver may not receive the signal from the GNSS well in the indoor environment, it is not prefer for the indoor UE to use the GNS positioning.

Figure 9:
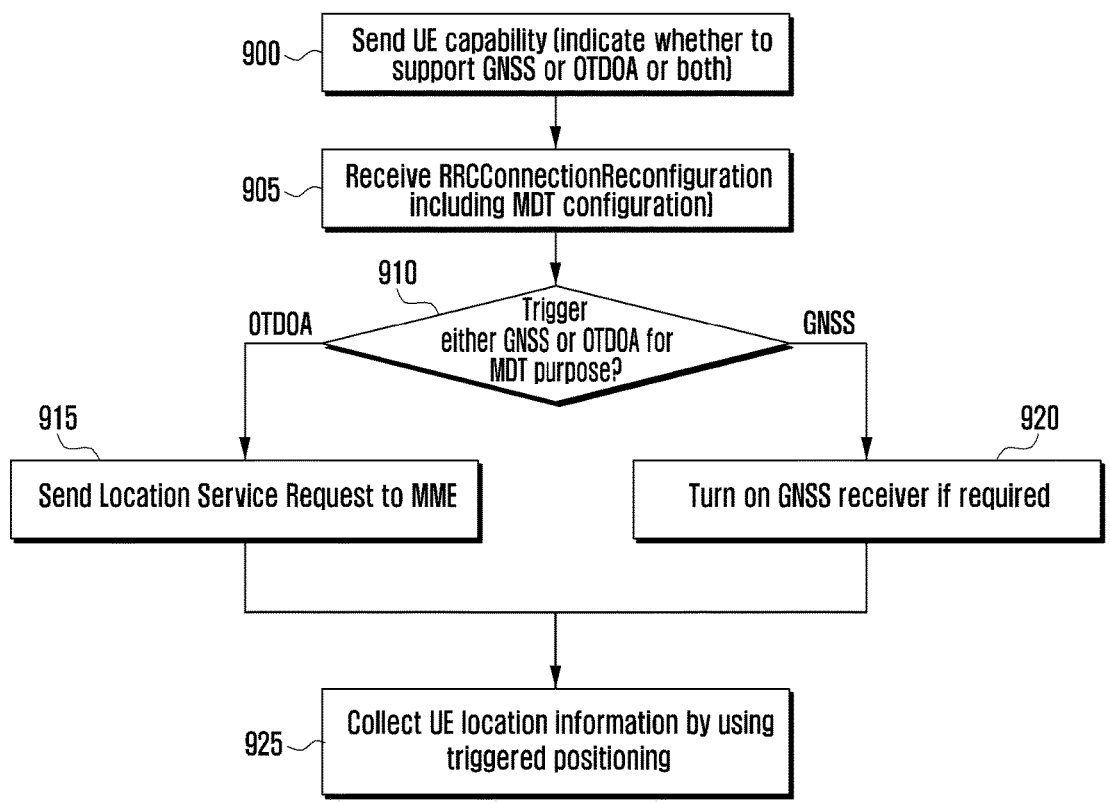
FIG. 9 is a flowchart illustrating a procedure for the UE to select a location information measurement method according to the instruction of the eNB and collecting location information using the selected method.

FIG. 9 is a flowchart illustrating a procedure for the UE to select a location information measurement method according to the instruction of the eNB and collecting location information using the selected method. The UE sends the eNB the UE capability information at step 900. This information includes the location information measurement methods supported by the UE. The supportability is determined according to a predetermined condition. For example, if the UE has a component necessary for a location information measurement method, it may be indicated that the method is supportable. Alto, if the UE is capable of acquiring accurate location information using the corresponding location information measurement method currently, it may be indicated that the method is supportable. In the case that only the component is considered, the GNSS positioning supportability is reported positively only when the UE has the GNSS receiver. However, if both the component and UE condition are considered and if the UE equipped with the GNSS receiver is indoor environment, the GNSS positioning supportability is reported negatively. The UE receives a message instructing to perform MDT in connected mode from the eNB at step 905. The message also includes the location information measurement method to be used in MDT. At this time, if the eNB is the indoor eNB, it may not use GNSS and thus it may be instructed to use one of the other location information measurement methods with the exception of GNSS. At step 910, the UE check the indicated location measurement method. If the OTDOA or A-GNSS is indicated, the UE sends the MME a Location Service Request message at step 915. In order to use OTDOA or A-GNSS, the UE has to request the network for initiation of location information measurement session. In more detail, the UE sends the E-SMLC the location Service Request message via the MME. In the case of using a standalone GNSS, the UE turns on the GNSS receiver at step 920. If the GNSS receive has been turned on already, the UE collects the UE location information immediately at step 925. In the case that the use of GNSS is instructed, the eNB may provide the UE the following supplementary informations at step 905. These informations are used for the UE to detect the satellite signal more quickly and reduce the measurement error. The supplementary information may be summarized as shown in table 1.

TABLE 1

| Assistance Data | |
| --- | --- |
| Reference Time | coarse or fine GNSS time information |
| Reference Location | an apriori estimate of its location (e.g., by cell-id, OTDOA) |
| Ionospheric Models | params to model the propagation delay through the ionosphere |
| Earth Orientation Parameters | params to construct the ECEF-to-ECI coordinate transformation |
| GNSS-GNSS Time Offsets | params to correlate GNSS time of one GNSS with other GNSS time |
| Differential GNSS Corrections | pseudo-range and pseudo-range-rate corrections |
| Ephemeris and Clock Models | params to calculate the GNSS satellite position and clock offsets |
| Real-Time Integrity | info about the health status of a GNSS constellation |
| Data Bit Assistance | info about data bits/symbols from a GNSS satellite at a certain time |

TABLE 1-continued

| Assistance Data | |
|---|---|
| Acquisition Assistance | info about visible satellites, reference time, expected code-phase, expected Doppler, search windows and other information of the GNSS signals |
| Almanac | params to calculate coarse GNSS satellite position and clock offsets |
| UTC Models | params to relate GNSS system time to Universal Coordinated Time |

The UE transfers the supplementary information provided by the eNB to the GPS module for facilitating location information measurement.

The location information measurement session is the interaction among the devices such as UE, MME, and location information server, and the eNB may request for the initiation of the location information session. One of the subject matters of the present invention is to have the UE request for initiating the location information session when the eNB wants to initiate location information session for MDT.

Figure 10:
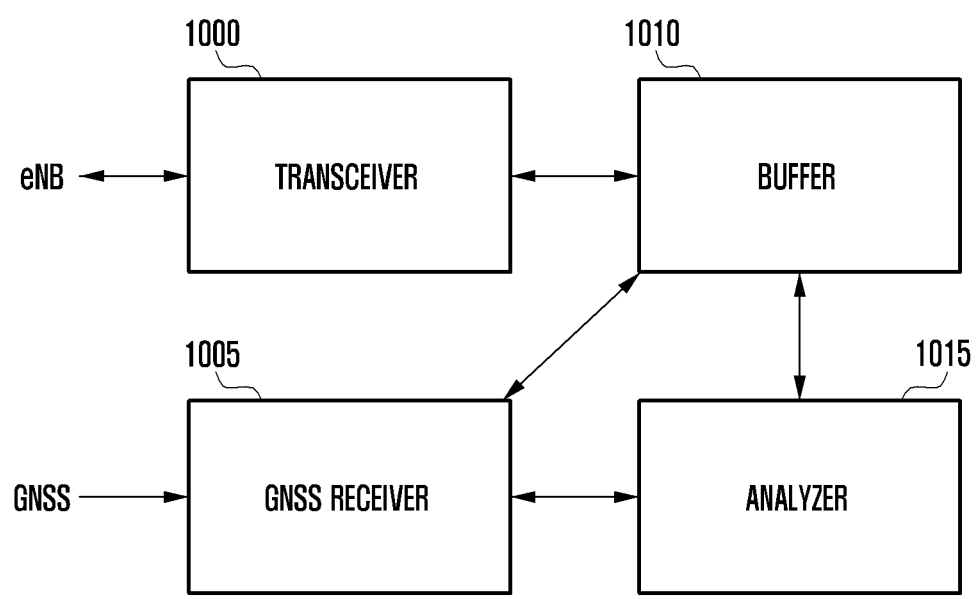
FIG. 10 is a block diagram illustrating the UE.

FIG. 10 is a block diagram illustrating the UE. The transceiver 1000 is used to receive the MDT configuration information or measure the channel signal. The informations collected by the transceiver are stored in the buffer 1010. The GNSS receiver 1005 collects the UE location and time information from the satellite signals. The collected informations are stored in the buffer 1010. The analyzer 1015 determines whether to include the time information in the MDT measurement information.

The invention claimed is:

1. A method by a terminal in a communication system, the method comprising:
   receiving channel measurement configuration information including information indicating whether to exclude channel information which is affected by an interference from a base station;
   measuring channel information;
   identifying whether the measured channel information is affected by an interference between communication modules of the terminal;
   generating, based on the channel measurement configuration information, reporting information by applying a weighted average of at least one channel information without the measured channel information which is affected by the interference between communication modules of the terminal, based on the channel measurement configuration information; and
   transmitting the generated reporting information.

2. The method of claim 1, wherein generating the reporting information is performed by an L3 filtering process using the following equation:

$$F_n=(1-a)\cdot F_{n-1}+a\cdot M_n,$$

with $F_{n-1}$ denoting a previous filtering value, $M_n$ denoting a newly measured value and $F_n$ denoting a current filtering value.

3. The method of claim 1, further comprising checking priority of a frequency band for communication of the terminal,
   wherein the transmitting of the generated reporting information comprises transmitting the generated reporting information including priority information of the frequency band for the communication of the terminal.

4. The method of claim 1, further comprising:
   determining whether the terminal has turned on a location measurement module; and
   turning, if the location measurement module has not been turned on, on the location measurement module,
   wherein transmitting the reporting information comprises transmitting a signal including the location information measured by the location measurement module.

5. The method of claim 1, wherein the transmitting the generated reporting information comprises:
   transmitting, if a measurement period determined based on the received channel measurement configuration information expires or the terminal transitions to a connected mode, the generated reporting information.

6. The method of claim 1, wherein the transmitting of the generated reporting information comprises:
   determining whether current Public Land Mobile Network (PLMN) after transitioning to a connected mode is included in a Minimization of Drive Test (MDT) PLMN list; and
   transmitting, if the current PLMN is included in the MDT PLMN list, the generated reporting information.

7. A terminal comprising:
   a transceiver configured to transmit and receive a signal; and
   a controller configured to:
      control the transceiver to receive channel measurement configuration information including information indicating whether to excluding channel information which is affected by an interference from a base station,
      measure channel information,
      identify whether the measured channel information is affected by an interference between communication modules of the terminal;
      generate, based on the channel measurement configuration information, reporting information by applying a weighted average of at least one channel information without the measured channel information which is affected by the interference between communication modules of the terminal, based on the channel measurement configuration information; and
      control the transceiver to transmit the generated reporting information.

8. The terminal of claim 7, wherein, for generating the reporting information, the controller is configured to perform an L3 filtering process using the following equation:

$$F_n=(1-a)\cdot F_{n-1}+a\cdot M_n,$$

with $F_{n-1}$ denoting a previous filtering value, $M_n$ denoting a newly measured value and $F_n$ denoting a current filtering value.

9. The terminal of claim 7, wherein the controller is further configured to check priority of a frequency band for communication of the terminal, and the transceiver is configured to transmit the generated reporting information including priority information of the frequency band for the communication of the terminal.

10. The terminal of claim 7, further comprising a location measurement module for measuring location information of the terminal,
   wherein the controller is further configured to turn, if the location measurement module has not been turned on, on the location measurement module, and the transceiver is further configured to transmit a signal including the location information measured by the location measurement module.

11. The terminal of claim 7, wherein the transceiver is further configured to transmit, if a measurement period determined based on the received channel measurement configuration information expires or the terminal transitions to a connected mode, the generated reporting information.

12. The terminal of claim 7, wherein the controller is further configured to determine whether a current Public Land Mobile Network (PLMN) after transitioning to a connected mode is included in a Minimization of Drive Test (MDT) PLMN list, and the transceiver transmits, if the current PLMN is included in the MDT PLMN list, the generated reporting information.

* * * * *